United States Patent
Skjæran et al.

(10) Patent No.: US 6,983,329 B1
(45) Date of Patent: Jan. 3, 2006

(54) METHOD FOR REDUCING SIGNALING IN AN TELECOMMUNICATIONS NETWORK BY ARRANGING GATEKEEPERS IN A HIERARCHICAL STRUCTURE

(75) Inventors: Espen Skjæran, Oslo (NO); Espen Iveland, Drammen (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 737 days.

(21) Appl. No.: 09/677,815

(22) Filed: Oct. 3, 2000

(30) Foreign Application Priority Data

Oct. 4, 1999 (NO) .................................. 1999-4828

(51) Int. Cl.
*G06F 15/173* (2006.01)
*G06F 13/00* (2006.01)
*H04L 12/28* (2006.01)

(52) U.S. Cl. .................. 709/238; 709/245; 370/401; 370/389

(58) Field of Classification Search ................ 370/352, 370/401, 408, 389; 455/417; 709/229, 238, 709/245
See application file for complete search history.

(56) References Cited

U.S. PATENT DOCUMENTS

| | | | |
|---|---|---|---|
| 5,377,262 A | 12/1994 | Bales et al. | 379/220 |
| 5,940,396 A | 8/1999 | Rochberger | 370/408 |
| 5,982,869 A | 11/1999 | Lozano et al. | 379/220 |
| 6,128,304 A * | 10/2000 | Gardell et al. | 370/401 |
| 6,229,804 B1 * | 5/2001 | Mortsolf et al. | 370/352 |
| 6,314,284 B1 * | 11/2001 | Patel et al. | 455/417 |
| 6,374,302 B1 * | 4/2002 | Galasso et al. | 709/238 |
| 6,519,249 B1 * | 2/2003 | Bennefeld et al. | 370/352 |
| 6,591,301 B1 * | 7/2003 | Li et al. | 709/229 |

FOREIGN PATENT DOCUMENTS

WO  WO 97/02689  1/1997

OTHER PUBLICATIONS

Rekhter, Y. et al., *RFC 1887*, IPv6 Unicast Address Allocation Architecture, Dec. 1995, pp. 4-26 (13 sheets); retrieved from internet site: http://sunsite.auc.dk/RFC/rfc1887.html.
Kuo, G.S., et al, "A New Architectural Concept of Hierarchical Routing Scheme for IP in Future, High-Speed Large Global Internet," IEEE 1998, pp. 638-643.

* cited by examiner

*Primary Examiner*—Paul H. Kang

(57) ABSTRACT

The invention relates to Internet telephony, and in particular an arrangement of gatekeepers in a H.323 network to reduce signalling during call set-up procedures. This is achieved by arranging the gatekeepers hierarchically, that is each gatekeeper knows a number of lower level gatekeepers (except the "bottom" nodes) and a higher level gatekeeper (except the "top" node). During set-up of a call, the gatekeeper connected to the calling user performs a user location algorithm on its attached users and lower level gatekeepers. If this procedure fails, it will proceed to its higher level gatekeeper.

5 Claims, 6 Drawing Sheets

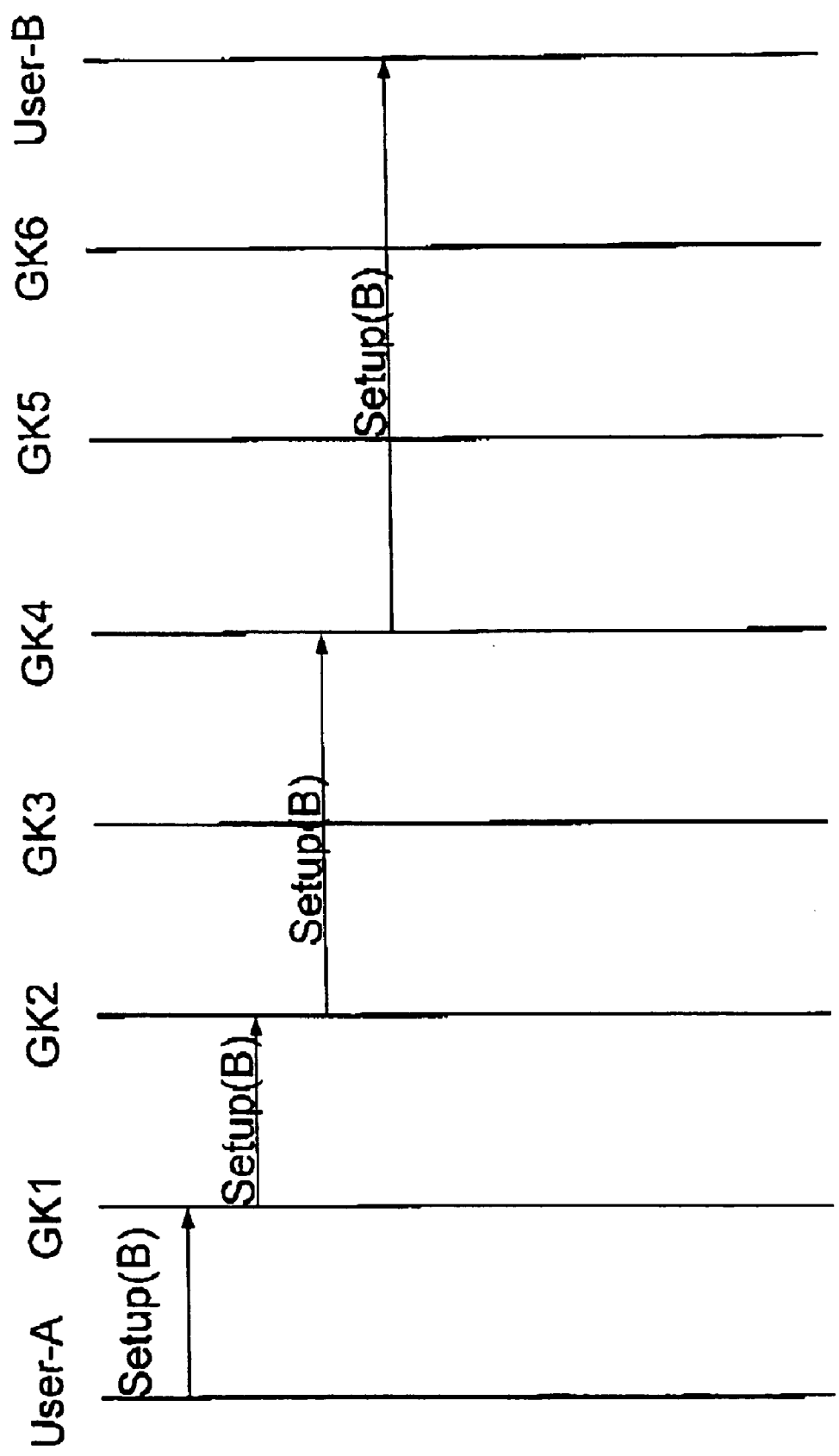
Figur 6

METHOD FOR REDUCING SIGNALING IN AN TELECOMMUNICATIONS NETWORK BY ARRANGING GATEKEEPERS IN A HIERARCHICAL STRUCTURE

TECHNICAL FIELD

The patent application applies to the field of Internet telephony, and in particular relates to the distribution of gatekeepers in a H.323 network.

THE PROBLEM AREAS

Voice telephony (non-IP) is based on an architecture of switches interconnected via fixed lines. A call from a calling party to a called party is routed between the switches based on number analysis. That is, the local switch of the caller analyses the dialled number as to land and trunk code prefixes, and routes the call to the switch serving the called party.

In modern multimedia telephony, comprising distributed gatekeepers in a H.323 network, there exist no similar mechanism based on number analysis for routing of calls. The technology of multimedia telephony originates from local area network environments, where elaborate routing schemes are regarded as unnecessary, instead relying on a peer-to-peer relationship between the gatekeepers.

Thus today H.323 requires a full mesh of gatekeeper knowledge before calls can be routed between these (All gatekeepers has to know all gatekeepers for calling to all users), or the use of multicast which has the same applications. Before setting up a call to a non-local user, the originating gatekeeper has to send a Location Request message to all the other gatekeepers for finding the address of the user. This is illustrated in FIG. 1, where GK1 when receiving a call from User A, must send Location Request to all the other gatekeepers to locate User B.

This situation scales very badly in a large H.323 network, as up to a point, all gatekeepers will spend most of their capacity processing and replying Location Requests from other gatekeepers. FIG. 3 (multicast) and FIG. 4 (unicast) presents the sequence diagrams for locating a user today.

However, hierarchical routing as such is known from some other network systems.

The document RFC 1887 (http://sunsite.auc.dk) describes the use of prefixes for hierarchical routing in IP ver.6. Routing is performed on a network level.

WO 97/02689 describes how data in network layer packets can be added or changed to extend the address field. However, this is strictly speaking not hierarchical routing, as the source router must know the destination.

U.S. Pat. No. 5,982,869 describes a method for automatic generation of routing tables from network topology. The tables are unique for each switch in a hierarchical network. The pòint is to optimalize by automatic configuration in a hierarchical network for international traffic.

U.S. Pat. No. 5,940,369 relates to a method for routing and automatic configuration in ATM networks. The nodes are arranged in a hierarchical fashion. However, this patent relates to specific problems in ATM networks which can be solved by an hierarchical organisation of the nodes.

THE INVENTION

OBJECTS OF THE INVENTION

An object of the invention is to provide an arrangement in an H.323 network that allow localisation of the parties using less message exchange between the gatekeepers and thus easing the load on each gatekeeper. This results in a faster connection process.

BRIEF SUMMARY OF THE INVENTION

The above object are achieved in an arrangement according to the invention, where the gatekeepers are organised hierarchical for routing/user location, as stated in the appended patent claims.

In an arrangement according to the invention the load of processing the Location Request is spread to fewer gatekeepers, which is a big advantage in a large H.323 network.

BRIEF DESCRIPTION OF DRAWINGS

FIG. 6 shows location of User-B using numbering plans in an H.323 network organised according to the invention.

DESCRIPTION OF SOLUTION

Figure 1:
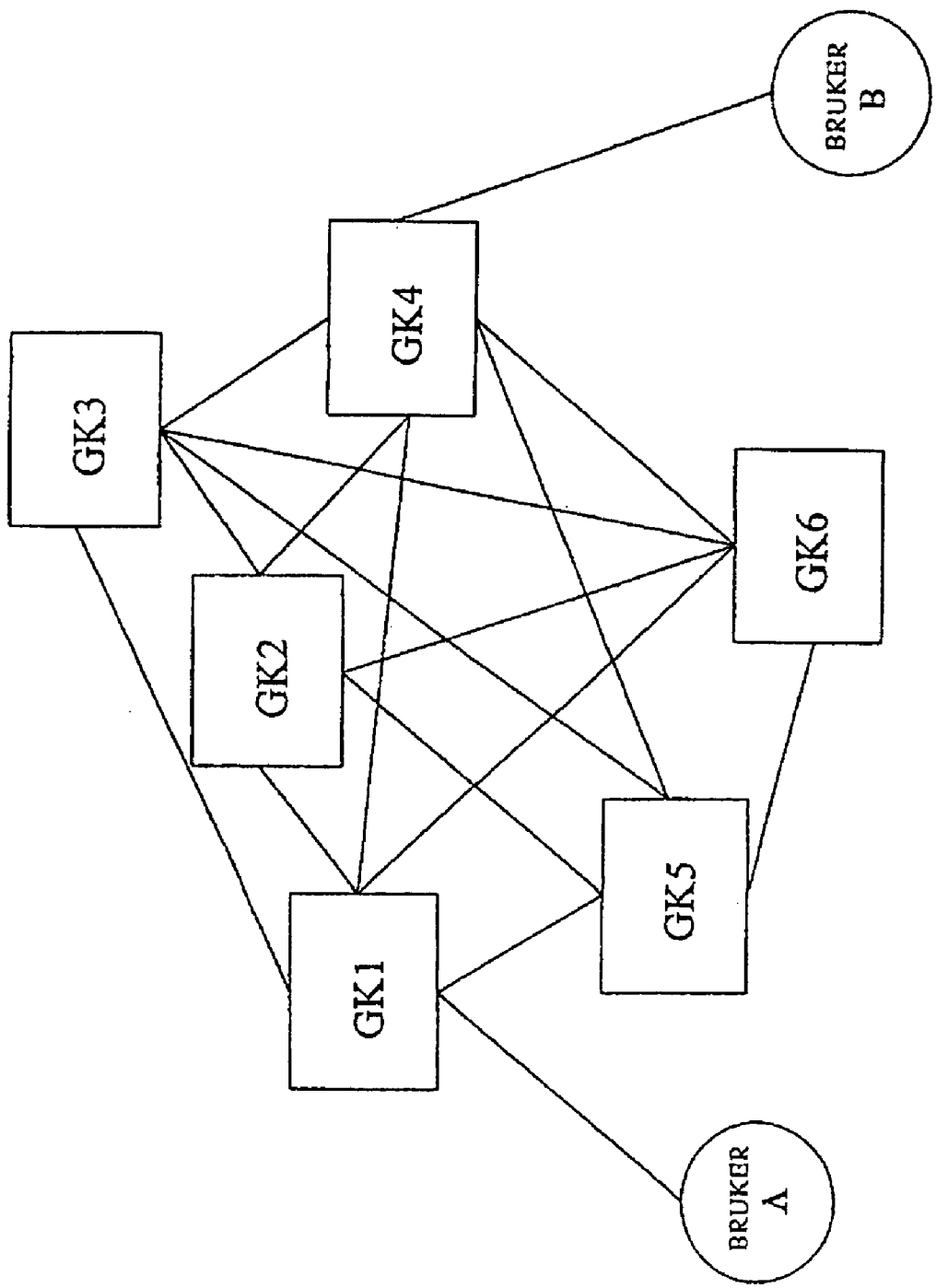
FIG. 1 shows a H.323 network as it is structured today.

Reference is made to FIG. 1 which shows a situation in a H.323 network of today. The network comprises a mesh of interconnected gatekeepers GK1 to GKn. Each gatekeeper is connected to a number of users. Each individual gatekeeper knows the identity of all users that are directly connected to it, but has no knowledge of the users that are connected to the other gatekeepers. However, the gatekeepers know all other gatekeepers.

In the situation depicted an User A, connected to GK1 tries to make a call to User B, who is connected to GK4. In order to route the call to User B, GK1 first has to locate User B. This may be performed either in a multicast process or in a unicast process.

Figure 3:
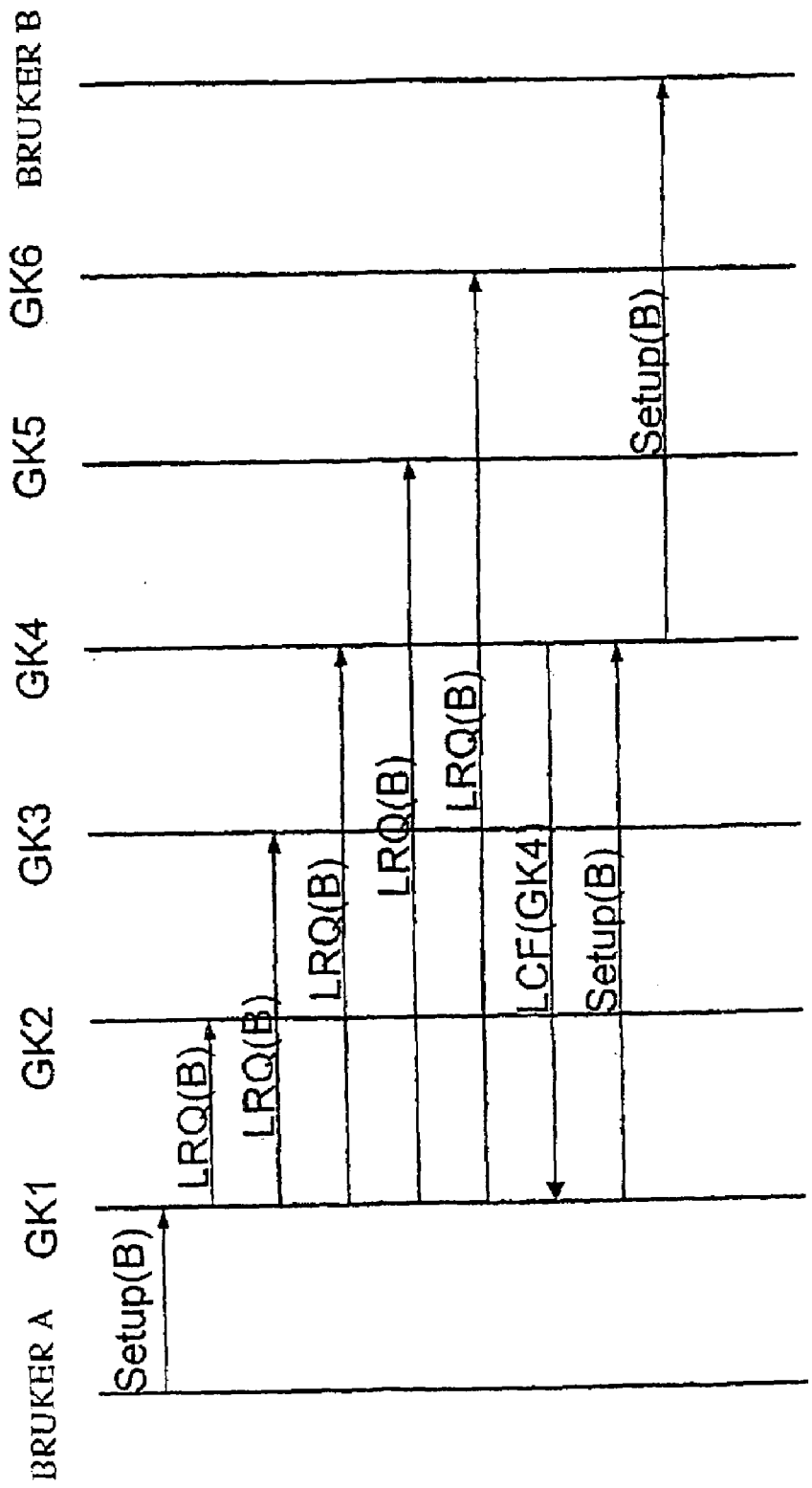
FIG. 3 shows locating of User-B in FIG. 1 using multicast LRQ (prior art).

FIG. 3 shows the signalling sequence taking place in a multicast scenario. At top, left, User A issues a set-up message which is received at GK1. To locate User B, GK1 transmits a Locate Request (LRQ) message to all the other gatekeepers in the network. In this instance GK4 recognises that the wanted User B is a member of its group of connected users, and answers the LRQ(B) message by transmitting a Locate Confirm (LCF) message back to GK1. GK1 then send a Set-up (B) message to GK4, which is then forwarded to User B.

Figure 4:
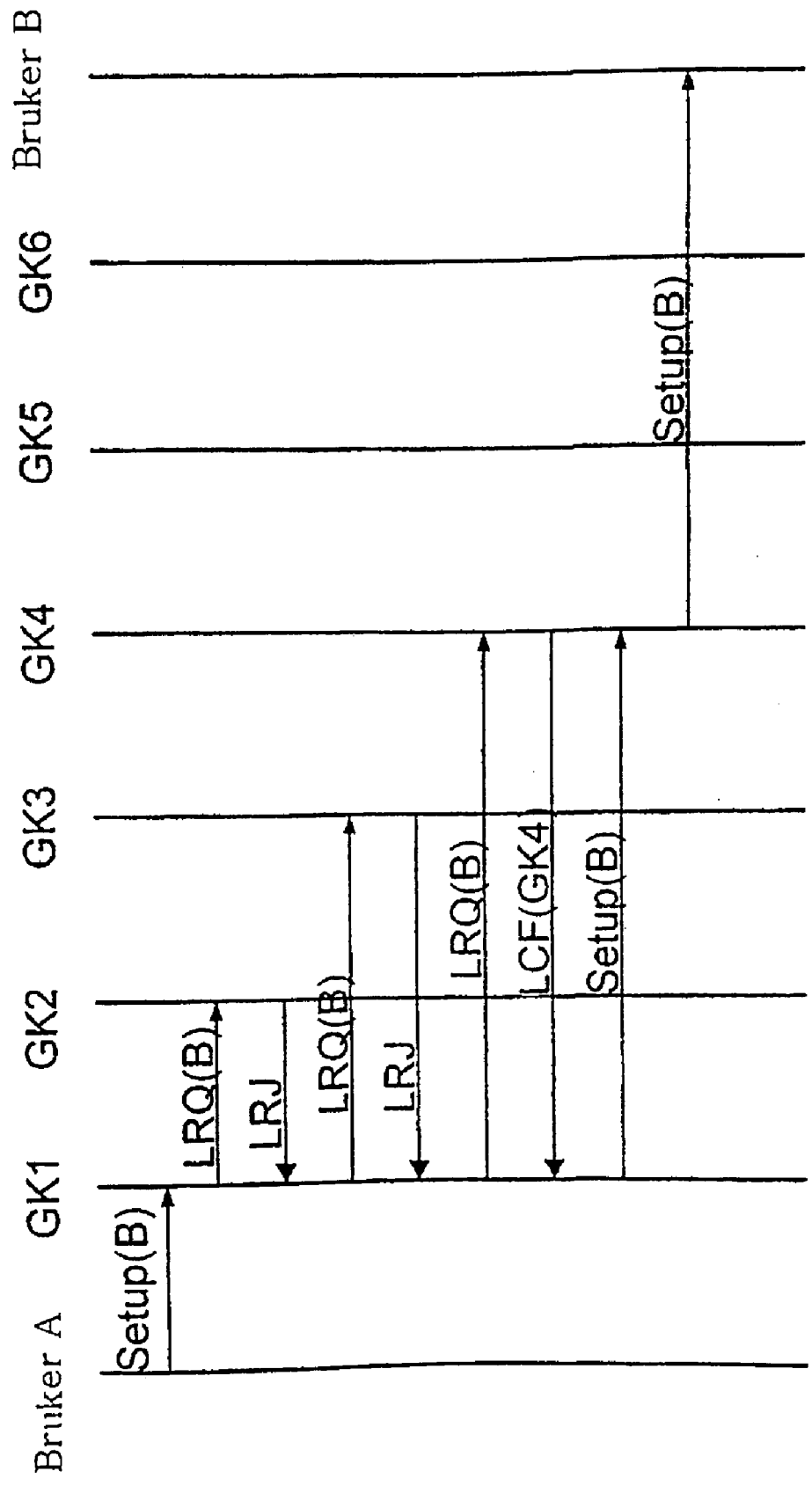
FIG. 4 shows location of User-B using unicast LRQ (prior art).

FIG. 4 shows the alternative steep procedure using an unicast algorithm. Again User A issues a Set-up(B) message which is received at GK1. GK1 now asks the other gatekeepers sequentially if they have an User B connected. First the LRQ(B) message is sent to GK2. GK2 answers that User B is not in its domain by issuing a Locate Reject (LRJ) message. GK1 repeats the process with other gatekeepers until one of the gatekeepers answers with a LCF(B) message, stating that User B is one of its connected users. GK1 then sends a Set-up message to GK4, which forwards the message further to User B.

Figure 2:
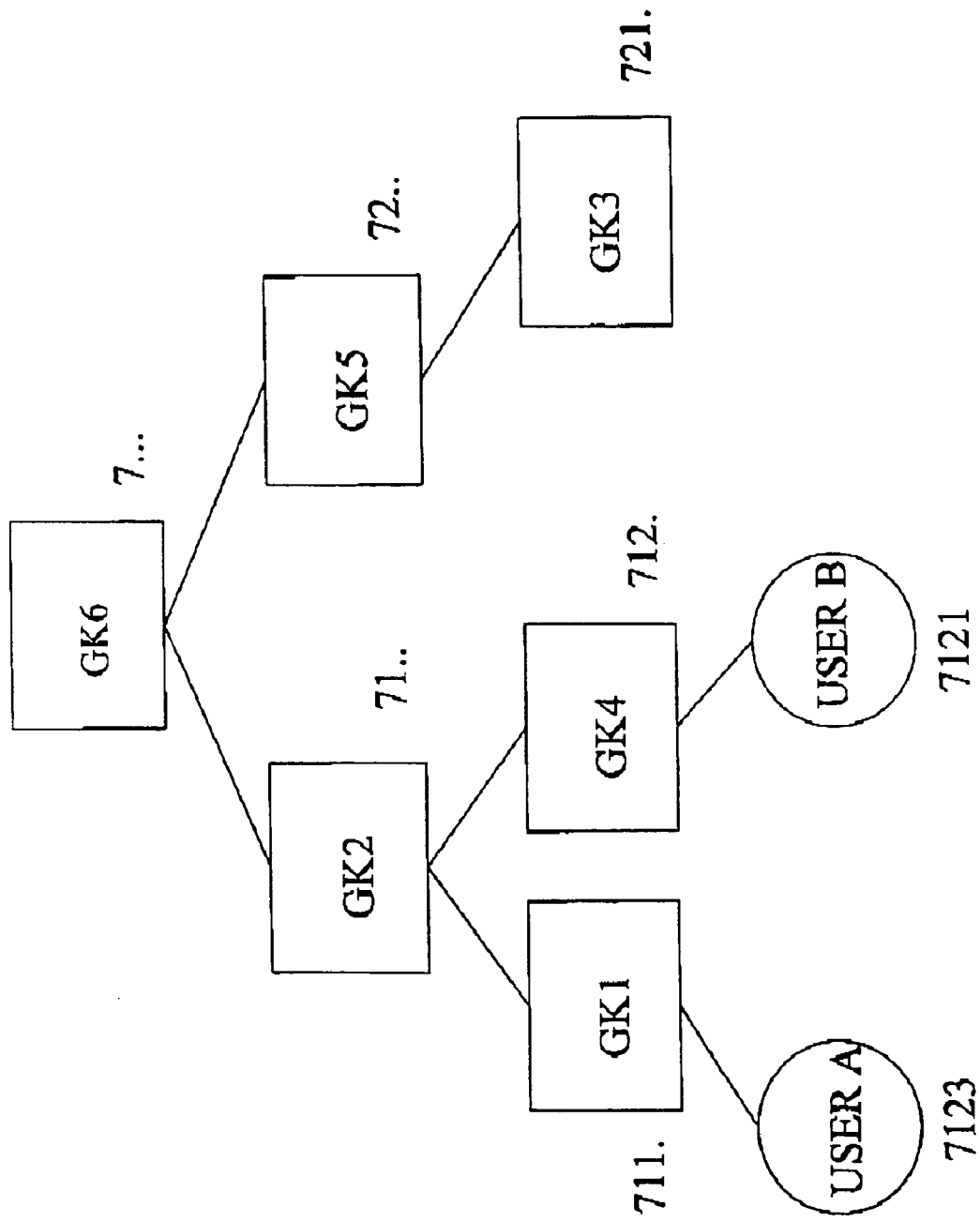
FIG. 2 shows an hierarchical organisation of gatekeepers in an H.323 network according to the invention, where calls are routed according to an embodiment of the invention using numbering plans.

FIG. 2 gives an example of the new organisation of the gatekeepers according to the invention. In terms of routing, the gatekeepers are organised hierarchically, in "lower" and "higher" gatekeepers. Each gatekeeper knows one higher level gatekeeper (if it is not the "top" node) and a number of lower level gatekeepers (if it isn't the "bottom" node).

A lower level gatekeeper knows its higher level gatekeeper, and assumes it knows a wider address space than itself. After its own user location algorithm is performed with no success (no address found locally or in lower level gatekeepers), it forwards the call to its higher level gatekeeper. This can be done either with a Location Request directly to this, or sending the SET-UP message directly, if it knows this gatekeeper support routing of the call signalling channel, thus saving two message exchanges.

Figure 5:
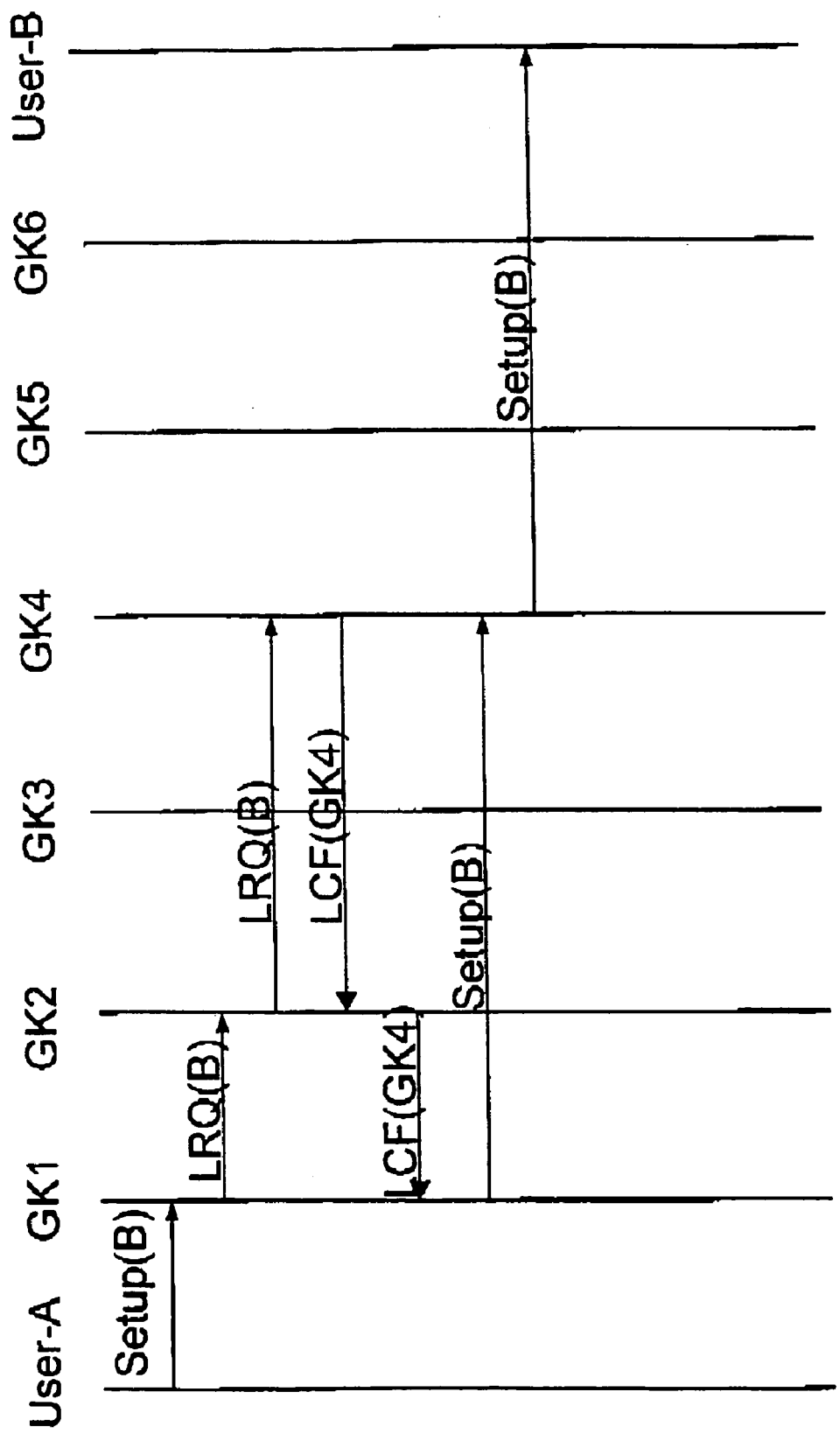
FIG. 5 shows location of User-B using LRQ in an H.323 network comprising gatekeepers organised according to the invention.

The higher level gatekeeper now tries to locate the user with its own location algorithm. If the called user is not locally registered, it might send Location Request messages to its lower level gatekeepers (minus the one originating the message) as illustrated in FIG. 5, or it can have some knowledge of the address spaces of its lower level gatekeepers. In the last case, the Location Request is sent the gatekeeper with the matching address space, or the SET-UP can be sent directly, if it knows this gatekeeper support routing of the call signalling channel.

This scheme could also be used for "hybrid" networks, by letting the gatekeepers know of some peer gatekeepers used in the location algorithm.

REFERENCES

ITU-T Recommendation H-323 (1996) "Visual Telephone Systems and Equipment for Local Area Networks which provide a non-guaranteed Quality of Service"

What is claimed is:

1. Method for establishing a connection between a calling party and a called party in a H.323 network wherein gatekeepers are arranged in a hierarchical manner, the method comprising:
    receiving by a first gatekeeper a Set-up command issued from a connected calling user,
    performing a user location algorithm by said first gatekeeper on its locally attached users,
    if this algorithm fails, sending a Location Request message to its lower level gatekeepers, wherein each lower level gatekeeper performs a user location algorithm on its attached users and lower level gatekeepers,
    if these user location algorithms fail, sending a Location Request message to its higher level gatekeeper, which performs a user location algorithm on its attached users and gatekeepers except the originating gatekeeper,
    if one of the user location algorithms succeeds, the gatekeeper concerned sending a Location Confirm message to the first gatekeeper,
    the first gatekeeper sending a Set-up message to the gatekeeper which has issued the Location Confirm message, which gatekeeper forwards said Set-up message to the called user, whereupon said connection is established.

2. Method for establishing a connection between a calling party and a called party in a H.323 network wherein the gatekeepers are arranged in a hierarchical manner, the method comprising:
    receiving by a first gatekeeper a Set-up command issued from a connected calling user,
    performing a user location algorithm on its locally attached users and lower level gatekeepers,
    if this user location algorithm fails, forwarding the call by said first gatekeeper to its higher level gatekeeper, which performs a user location algorithm on its attached users and gatekeepers except the originating gatekeeper,
    if one of the user location algorithms succeeds, said higher level gatekeeper forwards said Setup message to the called user, whereupon said connection is established.

3. A method for establishing a connection between a calling party and a called party in a H.323 network wherein the gatekeepers are arranged in a hierarchical manner, the method comprising:
    assigning to each gatekeeper in the plurality of gatekeepers, one higher level gatekeeper;
    assigning to each gatekeeper in the plurality of gatekeepers, a plurality of lower level gatekeepers,
    receiving a locate request;
    performing a user location algorithm responsive to the receiving a locate request to determine if the locate request can be fulfilled locally or by the plurality of lower level gatekeepers,
    if the user location request cannot be fulfilled, forwarding the locate request to the higher level gatekeeper,
    if the user location request can be fulfilled, forwarding the locate request to an identified lower level gatekeeper to complete the connection.

4. The method of claim 3 further comprising:
    receiving the locate request by the higher level gatekeeper;
    performing a user location algorithm responsive to the receiving a locate request to determine if the locate request can be fulfilled locally or by a plurality of lower level gatekeepers assigned to the higher level gatekeeper,
    if the user location request cannot be fulfilled, forwarding the locate request to a second higher level gatekeeper assigned to the higher level gatekeeper,
    if the user location request can be fulfilled, forwarding the locate request to an identified lower level gatekeeper assigned to the higher level gatekeeper to complete the connection.

5. A communications system comprising:
    a plurality of gatekeepers organized in a hierarchical manner, wherein each gatekeeper is assigned one higher level gatekeeper and a plurality of lower level gatekeepers,
    wherein when the gatekeeper receives a locate request, the gatekeeper performs a user location algorithm to determine if the locate request can be fulfilled locally or by the plurality of lower level gatekeepers,
    if the user location request cannot be fulfilled, the gatekeeper forwards the locate request to the higher level gatekeeper,
    wherein when the higher level gatekeeper receives the locate request, it performs a user location algorithm to determine if the locate request can be fulfilled locally or in a plurality of its own lower level gatekeepers,
    if the user location request cannot be fulfilled, the higher level gatekeeper forwards the locate request to its own designated higher level gatekeeper.

* * * * *

UNITED STATES PATENT AND TRADEMARK OFFICE
CERTIFICATE OF CORRECTION

PATENT NO. : 6,983,329 B1  
APPLICATION NO. : 09/677815  
DATED : January 3, 2006  
INVENTOR(S) : Skj.ae butted.ran et al.

Page 1 of 1

It is certified that error appears in the above-identified patent and that said Letters Patent is hereby corrected as shown below:

In Column 4, Line 14, in Claim 3, delete "the gatekeepers" and insert -- a plurality of gatekeepers --, therefor.

In Column 4, Line 50, in Claim 5, delete "wherein when the gatekeeper" and insert -- wherein when one of the plurality of gatekeepers --, therefor.

Signed and Sealed this

Fifteenth Day of April, 2008

JON W. DUDAS  
*Director of the United States Patent and Trademark Office*